United States Patent [19]
Van Leemputten et al.

[11] 3,821,083
[45] June 28, 1974

[54] PREPARATION OF IMMOBILIZED ENZYMES

[75] Inventors: Ekkerhard Van Leemputten, La Tour-Depeilz; Marc Horisberger, Mont-Pelerin, both of Switzerland

[73] Assignee: Societe D'Assistance Technique Pour Produits Nestle S.A., Lansanne, Switzerland

[22] Filed: June 6, 1972

[21] Appl. No.: 260,215

[30] Foreign Application Priority Data
June 21, 1971 Switzerland.......................... 9008/71

[52] U.S. Cl................ 195/63, 195/68, 195/DIG. 11
[51] Int. Cl.............................................. C07g 7/02
[58] Field of Search................ 195/63, 68, DIG. 11; 260/85.7

[56] References Cited
UNITED STATES PATENTS 2,467,430  4/1949  Izard .................................. 260/85.7
2,657,192  10/1953  Miller et al. ......................... 260/67
3,282,702  11/1966  Schreiner ........................... 195/63 X
3,705,084  12/1972  Reynolds ............................ 195/63
3,730,841  5/1973  Forgione et al..................... 195/68 X

OTHER PUBLICATIONS

Epton et al., Enzyme Insolubilization with Cross-Linked Polyacryloylaminoacetaldehyde, Proceedings of the Biochemical Society, April 22 & 23, 1971, Biochemical Journal, Vol. 123, No. 4, 7/1971 (pp. 15P, 21P & 22P).

*Primary Examiner*—David M. Naff
*Attorney, Agent, or Firm*—Watson Leavenworth Kelton & Taggart

[57] ABSTRACT

A water-insoluble enzyme product comprises an enzyme bonded to aldehyde groups of a water-insoluble polymer coated on an inert carrier. Polyacrolein is the preferred polymer, and enzymes include papain and trypsin. Processes for preparing the products are also described.

10 Claims, No Drawings

PREPARATION OF IMMOBILIZED ENZYMES

The present invention is concerned with the preparation of enzyme complexes, in particular water-insoluble products having enzyme activity, obtained by bonding an enzyme to an inert carrier.

The increasing application of enzymatic reactions, particularly enzymatic hydrolyses, has brought out the advantages of products having enzyme activity which are insoluble in aqueous media. These products have improved stability and may be recovered from the medium in simple manner. Using an insoluble enzyme, the reaction may be stopped by separating the insoluble enzyme from the substrate, without having recourse to inactivation of the enzyme by heating and without risk of contamination of the substrate.

The principal methods for preparing insoluble enzyme products include adsorption of an enzyme on an insoluble carrier, encapsulation in a polymer matrix, cross-linking with bi-functional substances to form a cross-linked coating layer on the carrier, and linking of the enzyme by covalent bonding to an insoluble polymer deposited on an inert carrier.

An object of the invention is to provide a simple process for insolubilising an enzyme by bonding to an inert carrier.

The invention provides a process for the preparation of a water-insoluble enzyme product which comprises forming a layer of a water-insoluble polymer having free aldehyde groups on an inert carrier and thereafter reacting an enzyme with the free aldehyde groups of the polymer.

The term 'inert carrier' is used to designate a water-insoluble substance in any form such as a membrane, a tube, granules or beads which does not react directly with the enzyme. Particularly suitable carriers include ceramic materials, glass, silica, silicates and metal oxides.

By "free aldehyde groups" are meant aldehyde groups carried by the polymer which are free to form chemical bonds.

The enzymes used carry functional groups capable of reacting with the free aldehyde groups of the polymer, for example free amino groups present in residues of amino acids such as lysine. Papain and trypsin are examples of preferred enzymes.

Polymer layers carrying free aldehyde groups may be formed on the inert carrier by various methods. In accordance with one preferred procedure, the polymer is dissolved in a solvent and the carrier contacted with the solution, as by immersion, and the solvent eliminated, e.g. by distillation and washing. The polymer may conveniently be polyacrolein, and crushed porcelain is a suitable carrier. Polyacrolein may be obtained by polymerisation of the monomer using a free radical-containing initiator, such as the redox systems described in German Pat. specification No. 1,082,054. Polyacrolein prepared in this manner comprises 10 to 70 percent of free aldehyde groups, which means that the number of available aldehyde groups corresponds to 10 to 70 percent of the number of molecules of monomer used. Although on deposition on the carrier it is only the free aldehyde groups at the surface of the polymer layer that are available for reaction with the enzyme, their number is sufficient to ensure adequate bonding.

Alternatively, a coating of a water-insoluble polymer which is soluble in common organic solvents and has reactive groups capable of being transformed into free aldehyde groups is deposited on an inert carrier. This deposition may be carried out by immersion of the inert carrier in the organic solution, followed by elimination of the solvent by distillation and washing. Free aldehyde groups are then regenerated on the polymer coating the inert carrier. For example, a coating of polyacrolein butyl- or methyl-acetal in solution in a solvent such as ethyl acetate may be deposited on an inert carrier such as glass beads or crushed porcelain. After elimination of the solvent the regeneration of the aldehyde groups of the polymer is carried out by acid hydrolysis of the acetal, for example in a column packed with the inert carrier coated with polymer.

According to a further variant, a polymerisable substance, such as acrolein, having at least one aldehyde function, which on polymerisation forms a water-insoluble product having free aldehyde groups may be deposited on the inert carrier. Polymerisation of this substance is then induced and the resulting carrier is recovered.

Irrespective of the method of preparation of the carrier, the reaction with the enzyme is conveniently effected by immersing the carrier in a solution of the enzyme or by passing the enzyme solution through a column packed with the carrier, and it has been found that the reaction parameters (quantities, time, temperatures, pH) may be varied within broad limits. Furthermore, the medium does not exercise a notable influence on the bonding reaction but, of course, it should be substantially inert with respect to the enzyme and carrier.

The quantities of enzyme and carrier used, as well as the concentration of the solution containing the enzyme, have no critical limits. The quantities and concentration may be chosen having regard to the nature of the reactants in order to obtain an optimum bonding yield.

As indicated, the pH and temperature may be chosen within broad limits, provided that the properties of the enzyme are not adversely affected. Although it is preferred to carry out the reaction at a pH of 7 to 8, desirably in a buffer solution, the bonding of the enzyme to the polymer may be carried out in the pH range extending from 1 to 11. Also, whilst ambient temperatures are preferred, the reaction temperature may be higher or lower, the upper limit being the inactivation temperature of the enzyme.

Reaction times may be chosen between a few minutes and several hours; most satisfactoy results have been obtained with times of 3 to 5 hours.

Upon completion of the reaction the enzyme product may be recovered by simple means such as filtration, decantation or centrifugation, followed by washing (distilled water, buffer solution). The quantity of enzyme bonded may be obtained by comparing the enzyme activity of the product, on an appropriate substrate, with the activity of the soluble enzyme on the same substrate.

The invention is illustrated by the following examples, the percentages being by weight. In the examples, the quantities of enzyme bonded to the carrier were determined by comparing the enzyme activity of the insoluble product, with regard to a particular substrate, with the activity of the soluble enzyme on the same substrate. α, N-benzoyl-DL-arginine-4-nitroanilide solution was used as substrate, and the activity determined by estimating the liberated p-nitroaniline (U.V. absorption spectrum at a wavelength of 405 nm).

EXAMPLE 1

Polyacrolein is obtained by polymerisation of the monomer using as initiator a redox system of hydrogen peroxide-sodium nitrite, and a 1 percent solution of the polymer in tetrahydrofurfuryl alcohol is prepared.

50 ml of porous crushed porcelain, the granules of which have an average size of 2 to 3 mm, are immersed in this solution and the tetrahydrofurfuryl alcohol is distilled under vacuum. The porcelain is then carefully washed with distilled water. During this washing, the last traces of alcohol pass into solution in the water and are eliminated. The wash water may also entrain a certain amount of polyacrolein, but this quantity is insufficient however to adversely affect the subsequent bonding of the enzyme.

The washed coated porcelain is then immersed for 8 hours at ambient temperature in a buffer solution of 0.05M sodium barbital hydrochloride, at pH 8.0, containing 100 mg of papain per 25 ml of solution. The reaction may also be carried out by cycling the solution through a column pack with the carrier.

The resulting product is then washed with distilled water, then with a buffer solution at pH 7.2, containing, per 500 ml of solution, 0.605 g of cysteine hydrochloride, 6.75 g of potassium phosphate and 10 ml of a decinormal solution of the disodium salt of ethylene diamine tetraacetic acid.

The estimation of the enzyme activity of the product shows that 13 mg of papain are bonded to 50 ml of porcelain.

EXAMPLE 2

Polyacrolein methyl-acetal is prepared by a method similar to that described by Weygand-Hilgetag in Organisch-Chemische Experimentierkunst, page 455 (1964).

5.6 g of polyacrolein having 6.2 percent of reducing groups are suspended in 80 ml of methanol. 13 ml of trimethyl-orthoformate are then added, followed by 0.05 ml of concentrated hydrochloric acid and the mixture is heated until the polyacrolein has completely dissolved. The solution is then neutralised with a 30 percent sodium hydroxide solution and concentrated by evaporation of the methanol under reduced pressure.

The resulting syrup is taken up in 300 ml of chloroform, washed twice with a saturated aqueous sodium bicarbonate solution, and finally three times with water. The organic phase is dried on anhydrous sodium sulphate, filtered and evaporated. The resulting polyacrolein methyl-acetal is dissolved in 30 ml of ethyl acetate.

50 ml of crushed porcelain are immersed in 100 ml of ethyl acetate to which are added 5 ml of the polyacrolein methyl-acetal solution in ethyl acetate. The solvent is then eliminated by evaporation under reduced pressure followed by heating at 70° C under vacuum for 30 minutes.

The free aldehyde groups of the polymer are then regenerated by immersing the porcelain coated with polyacrolein acetal for 8 hours, at ambient temperature, in a normal solution of hydrochloric acid. Regeneration may also be carried out in a column.

The experimental determination of the presence of free aldehyde groups regenerated by acid hydrolysis of polyacrolein methyl-acetal, as well as their quantitative estimation, were performed in parallel on a polymer in powdered form. The estimation of reducing groups according to the Park and Johnson method, adapted to insoluble materials, as described by J. S. Thompson and G. D. Schockman in Analytical Biochemistry, 22, 260–268 (1968), showed a number of free aldehyde groups equal to 9 percent of the number of molecules of monomer used.

Even though only the superficial aldehyde groups are available for bonding, the results given below show that their number is sufficient to ensure adequate bonding of the enzyme.

The coated porcelain, after acid hydrolysis of the polyacrolein methyl-acetal, is treated in a column by circulation of 20 ml of a buffer solution of 0.05M sodium barbital hydrochloride at pH 8.0, containing 200 mg of trypsin. This treatment is performed for 5 hours at ambient temperature, with recycling of the solution.

The estimation of the enzyme activity of the final product shows that 10 mg of trypsin are bonded to 50 ml of porcelain.

EXAMPLE 3

Polyacrolein n-butyl-acetal is obtained by suspending 10 g of polyacrolein in 200 ml of n-butanol in the presence of 1 g of p-toluene sulphonic acid as acetylisation catalyst. After heating at boiling point for 5 minutes the polyacrolein is dissolved. The solution is concentrated by evaporation under vacuum, taken up in chloroform (or another solvent such as benzene or toluene) washed twice with a saturated aqueous solution of sodium bicarbonate, and finally three times with water. The organic phase is dried on anhydrous sodium sulphate and evaporated. A 10 percent solution of the resulting polyacrolein n-butyl-acetal is prepared in ethyl acetate. 80 g of glass beads, 0.3 mm in diameter, are immersed in 100 ml of ethyl acetate to which is added 1 ml of the 10 percent polyacrolein n-butyl-acetal solution in ethyl acetate. The solvent is eliminated by evaporation under vacuum and heating at 70° C under vacuum for 30 minutes.

The free aldehyde groups of the polymer are then regenerated by immersing the coated glass beads in a normal solution of hydrochloric acid at ambient temperature for 8 hours or by using a column.

The resulting product is then placed in a glass spiral or a column, washed with distilled water and treated by circulating 30 ml of a buffer solution of 0.1M sodium barbital hydrochloride containing 100 mg of papain.

This treatment is carried out for one hour at ambient temperature with a throughput of solution of 1.4 ml per minute. The resulting product, after washing at 42° C with a buffer solution of cysteine hydrochloride at pH 7.2, contains 5.6 mg of bonded papain.

EXAMPLE 4

A carrier is prepared consisting of porous crushed porcelain coated with a layer of polyacrolein n-butyl-acetal, by immersing 50 ml of porcelain in 100 ml of a polyacrolein n-butyl-acetal solution in ethyl acetate prepared as described in Example 3. The solvent is then eliminated by distillation under vacuum at 70° C and the deposited polymer is subjected to the acid hydrolysis treatment described in Example 3. After washing with water to neutrality, the carrier is treated with 20 ml of a buffer solution of 0.05M sodium barbital hydrochloride at pH 8.0, containing 200 mg of trypsin. This treatment is carried out for 5 hours at ambient temperature.

The estimation of the enzyme activity of the resulting product shows that 5.6 mg of trypsin are bonded to 50 ml of porcelain.

EXAMPLE 5

50 ml of porous crushed porcelain previously washed with a 30 percent solution of hydrochloric acid, then with water, and dried at 110° C for 8 hours are immersed in 20 ml of freshly distilled acrolein for 15 minutes. The granules are immersed in a flask containing 150 ml of degassed water, under a nitrogen atmosphere, and thereafter 2.2 ml of hydrogen peroxide, 4 ml of 2N aqueous sulphuric acid solution and 1.38 g of sodium nitrite in 50 ml of water are successively added.

After 45 minutes the acrolein is polymerised. The coated porcelain is washed carefully with water and mixed with 25 ml of a buffer solution of 0.05M sodium barbital hydrochloride at pH 8.0, containing 100 mg of papain.

Estimation of the enzyme activity of the resulting product shows that 21 mg of papain are bonded to the 50 ml of porcelain.

We claim:

1. A process for the preparation of a water-insoluble enzyme product which comprises contacting an inert carrier with a solution of acetal of polyacrolein in an organic solvent, eliminating said solvent to obtain a layer of water-insoluble polymer on said carrier, subjecting said layer to acid hydrolysis to obtain free aldehyde groups, and reacting an enzyme with said free aldehyde groups of the polymer.

2. A process according to claim 1 in which the acetal of polyacrolein is the methyl-acetal or the butyl-acetal.

3. A process according to claim 1 in which the enzyme contains at least one amino group capable of reacting with at least one free aldehyde group of the polymer.

4. A process according to claim 3 in which the enzyme is papain or trypsin.

5. A process according to claim 1 in which the reaction between the enzyme and the polymer is effected in a buffer solution.

6. A process according to claim 5 in which the buffer solution has a pH of 7 to 8.

7. A water-insoluble enzyme product produced by the process of claim 1.

8. A product according to claim 7 in which the enzyme is papain or trypsin.

9. A product according to claim 7 in which the acetal of polyacrolein is the methyl-acetal or the butyl-acetal.

10. A product according to claim 7 in which enzyme is bonded essentially only to superficial aldehyde groups of the layer.

* * * * *